3,320,077
INORGANIC PLASTIC CEMENTS AND PROCESS
FOR THE PREPARATION THEREOF
William L. Prior, 95 N. 10th St., Newark, Ohio 43055
No Drawing. Filed Jan. 19, 1966, Ser. No. 521,517
23 Claims. (Cl. 106—105)

This application is a continuation-in-part of my application Serial Number 314,479, filed October 7, 1963, now abandoned.

This invention relates to inorganic plastic (magnesium oxide) cements and has to do more particularly with the provision of truly insoluble magnesium oxychloride and the magnesium oxysulfate cements which are plastic in character in that they exhibit many of the physical characteristics that are normally associated with organic plastics.

While the magnesium oxide cements have been the subject of numerous patents and technical writings, the literature is both confused and confusing as to the very nature of the material themselves. For example, a cement made by the reaction of magnesium oxide with a solution of magnesium sulfate (Epsom salts) is generally referred to as "magnesium oxysulfate cement" which is a misnomer. Rather, such system is correctly identified as sulfated magnesium hydroxide which is highly soluble in water. While true oxysulfates have been identified in the laboratory, they have been found in trace amounts in cements which are essentially sulfated magnesium hydroxide and are identifiable only by X-ray diffraction. Similarly, the oxychlorides have been identified as such in the laboratory but in spite of statements in the literature to the contrary, no one has heretofore developed truly insoluble commercially usable oxychloride and oxysulfate cements. The cements currently identified as "magnesium oxychloride cements" readily hydrolyze to produce magnesium chloride. Free magnesium chloride is highly corrosive, and corrosion is a decidedly detrimental factor in the presently known oxychloride cements.

The prior art has also suggested the use of various phosphate additives in the inorganic plastic cements in order to improve various physical properties of the cements. Thus, in Patent Numbers 1,019,083; 1,853,522; 2,351,641; 2,543,959 and 2,702,753, the use of phosphates of various kinds has been suggested. The result obtained is improved wet strength of the cement, however, a number of these patents are directed towards the reduction of excessive contraction upon curing of the cements and the reduction of calcium carbonate by the use of phosphoric acid. While the use of these phosphates in this instance does somewhat improve the wet strength of the prior art cements and reduce contraction upon curing and the like, the cements ultimately produced have low dry and wet strengths.

In accordance with the instant invention, I have discovered that true oxychloride and oxysulfate cements can be produced by reacting magnesium oxide in highly concentrated solutions of magnesium sulfate and/or magnesium chloride. Such highly concentrated solutions preferably are near saturation or super saturated which is appreciably above what has heretofore been regarded as the maximum attainable concentrations. For example, in United States Patent 2,939,799, dated June 7, 1960, entitled Magnesium Oxychloride Cements, it is taught that concentrations in excess of about 28° Baumé (approximately 59 percent by weight magnesium chloride hexahydrate ($MgCl_2 \cdot 6H_2O$) solids) are to be avoided. Similarly, the ASTM standards for magnesium oxychloride and magnesium oxysulfate cements lists the solids concentration of 48 percent by weight as the limit for magnesium sulfate heptahydrate ($MgSO_4 \cdot 7H_2O$) solids concentration, with the recommended $MgCl_2 \cdot 6H_2O$ concentration being on the order of a 22° Baume solution containing 42.5 percent by weight of the hexahydrate salt. Yet it is by means of very highly concentrated solutions that I am able to produce cementuous materials which are of plastic character.

I have particularly found that in order to produce water insoluble high strength, cured inorganic cements, using a high concentration magnesium salt solution with the magnesium oxide, the blending must be done in a manner to deagglomerate and deflocculate the magnesium oxide. The use of such vigorous blending conditions when using a high concentration magnesium salt solution is unknown to the prior art.

I have also found that the highly concentrated solutions can be best prepared by the use of water-soluble phosphate additives such as sodium hexametaphosphate, which act to prevent the magnesium salt from precipitating out of the solution at less than ambient temperatures.

Accordingly, a principal object of the present invention is the provision of inorganic plastic cement formulations and the process for their preparation which contain water insoluble magnesium oxysulfate and/or magnesium oxychloride as the major phase, such cements containing but trace amounts of the hydroxide phases, and, hence being of truly insoluble character.

A still further object of the present invention is the provision of procedures for preparing such magnesium oxychloride and oxysulfate plastic cements wherein a water-soluble phosphate additive such as the aforementioned sodium hexametaphosphate is utilized to maintain the magnesium sulfate and/or magnesium chloride solids in solution in a concentration appreciably above that heretofore achieved, such highly concentrated solution forming when admixed with magnesium oxide truly water insoluble plastic cements.

The foregoing objectives, together with others, which will appear hereinafter or which will be apparent to the skilled worker in the art upon reading the specification and accomplished by those procedures and techniques which I shall now describe as certain exemplary embodiments.

The present invention thus relates to a process for the preparation of an inorganic plastic cement slurry by the reaction of magnesium oxide with a magnesium salt in the presence of water which cures into a high strength, substantially water insoluble plastic cement which comprises mixing by high shear blending (a) a magnesium salt selected from the group consisting of magnesium chloride and magnesium sulfate in the presence of sufficient water to produce a highly concentrated solution of the magnesium salt, and (b) finely divided, active magnesium oxide which is reactive with the magnesium salts so as to deagglomerate and deflocculate the magnesium oxide and to uniformly disperse the magnesium oxide and magnesium salt solution, thereby producing the inorganic plastic cement slurry. The cement slurry preferably has a low viscosity. This plastic cement slurry can be cooled to below ambient temperatures to retard the curing for storage. It can be cured slowly by letting it stand at ambient temperatures or rapidly by heating to elevated temperatures with or without pressure. Further, various filler materials can be admixed with the cement slurry.

It is particularly preferred in the process of the present invention to dissolve the magnesium salt in water prior to the blending with the magnesium oxide. This insures that all of the magnesium salt is provided in solution for reaction with the magnesium oxide. However, it will be appreciated that the dry magnesium salt and magnesium oxide ingredients can be mixed together and then admixed with sufficient water to produce the highly conentrated solution of the magnesium salt before or during the blending step.

An important feature of the present invention is the blending to deagglomerate and deflocculate the magnesium oxide which produces a low viscosity inorganic plastic cement slurry. The prior art has not used such blending conditions with highly concentrated magnesium salt solutions and unexpectedly it has been found that water insoluble cements can be produced. The preferred cement slurries produced by the present invention also have a low viscosity and are non-thixotropic, which is contrary to expectations based upon a knowledge of the prior art, since the prior art indicates that such concentrated solutions are to be avoided because of the high viscosity of the cement slurry.

The process of the present invention further contemplates the provision of a phosphate in the cement in an amount sufficient to improve the wet strength of the cement, preferably by providing a phosphate dissolved in the concentrated magnesium salt solution. Thus, for instance, the following water soluble phosphates can be used: phosphoric acids, including orthophosphoric, pyrophosphoric acid and monomagnesium phosphate; polyphosphates, including pyrophosphates, tripolyphosphates, tetrapolyphosphates and long chain polyphosphates particularly sodium polyphosphates, such as sodium hexametaphosphate and sodium tripolyphosphate and various other alkali metal polyphosphates; the various alkali metal mono and dibasic phosphates such as mono basic sodium phosphate and the various ammonium phosphates such as ammonium polyphosphate and the like. The various classes of water soluble phosphate compounds are described in "Phosphorous and Its Compounds," volume 1, Chemistry by John R. Van Wazer, Interscience Publishers, Inc., New York (1958).

The water soluble phosphate salts cannot be dissolved directly in highly concentrated magnesium salt solutions. They must be first dissolved in water and then the magnesium salt dissolved in the water. The polyphosphates are particularly preferred in this instance since they maintain the magnesium salt in solution where the solution is cooled to less than ambient temperatures, probably by chelation. The strongly acid phosphate salts as well as the acids are also particularly preferred for this purpose. Thus, the solution used in the preparation of the inorganic plastic cement slurries comprises a water solution of (a) a magnesium salt selected from the group consisting of magnesium chloride and magnesium sulfate, the solution containing a concentration of magnesium salts such that water soluble phosphate salts will not dissolve upon addition to the magnesium salt solution and (b) about one to six percent by weight based upon the weight of the magnesium salt hydrate of a water soluble phosphate salt dissolved in the solution are contemplated as reactive magnesium salt solutions in the present invention.

The present invention also contemplates the use of difficultly soluble salts of the phosphates in the inorganic plastic cement slurries of the present invention to improve the wet strength of the cured cement. The use of such salts as well as other materials in magnesium cements has been found by the prior art to improve the properties of the resulting cured inorganic plastic cements. Thus, for instance, phosphates or secondary phosphates of metals such as the alkaline earth metal phosphates which are difficultly soluble, including calcium and magnesium phosphates as well as aluminum and copper phosphates and acid phosphates can be used. Various other difficultly soluble metal phosphates can be used such as those described in Patent Number 2,351,641; however, they are not preferred.

The soluble phosphate salts are preferred over the insoluble phosphate salts primarily because of the better wet strengths of the cements produced. This is believed to be because of the interaction of the soluble phosphate salts with the magnesium oxide to form insoluble magnesium phosphate complexes or compounds which improve the wet strength of the resulting cured cement product.

The process of the present invention produces unique inorganic plastic cements which are water insoluble. In particular, various articles of manufacture comprising a high strength, water insoluble cured inorganic plastic cement with the system selected from the group consisting of water insoluble magnesium oxysulfate and magnesium oxychloride as a major phase and only trace amounts of water soluble sulfate hydroxide and/or chloride hydroxide phases can be produced. The articles of manufacture can be the cements without any filler materials or various filler materials can be incorporated into the cements. Further, the preferred cements contain a phosphate salt which is insoluble in the cement as a minor phase to improve the wet strength of the cement. The preferred cements have a magnesium oxysulfate system of $5MgO \cdot MgSO_4 \cdot 8H_2O$ and/or magnesium oxychloride system of $5MgO \cdot MgCl_2 \cdot 9H_2O$ which are water insoluble.

Having generally described my invention, the following examples are illustrative of the process for the preparation of the inorganic cements and the magnesium salt solutions.

EXAMPLE I

Considering first the preparation of magnesium oxysulfate cements, I first prepared a $MgSO_4 \cdot 7H_2O$ solution containing about 50 to 75 percent by weight solids. The solution was prepared by adding the $MgSO_4 \cdot 7H_2O$ crystals to water containing approximately 1 to 6 percent by weight sodium hexametaphosphate based upon $$MgSO_4 \cdot 7H_2O$$

solids content. It was found that the magnesium sulfate hydrate could be more rapidly solubilized by heating the solution to a temperature between about 120° F. to the boiling point of the solution.

The magnesium oxide was then added to the solution and thoroughly admixed (blended). The admixing of the solution and the magnesium oxide is very important and should be of a high shear, high impact character so as to thoroughly deagglomerate and deflocculate the magnesium oxide and to disperse the magnesium oxide in the magnesium sulfate solution. In order to achieve the proper blending, a high shear propeller mixer (such as an Osterizer blendor) was used when small batches were being blended. For larger batches, a colloid mill can be used.

A preferred formulation for magnesium oxysulfate cements in accordance with the invention is (all parts being by weight):

| | Parts |
|---|---|
| $H_2O$ | 33 |
| $MgSO_4 \cdot 7H_2O$ | 100 |
| MgO | 100 |
| Sodium hexametaphosphate ($Na_6P_6O_{18}$, commercially designated $Na_{16}P_{14}O_{43}$) | 1 |

Since the chemical reaction takes place between the individual ions, and since these ions cannot act upon each other at a distance, any condition which increases the frequency of ionic collision will promote the speed and completeness of the reaction. Thus, the greater the concentration of the solution, the better is the chance that ions of one kind will find the ions of another kind with which they may react. Since magnesium oxide is soluble in the $MgSO_4 \cdot 7H_2O$ solution, the more highly concentrated the solution, the more soluble the magnesium oxide, which in turn forms a higher percentage of the phase $$5MgO \cdot MgSO_4 \cdot 8H_2O$$

which is a true oxysulfate. In other words, as the water content is decreased, the probability of obtaining the hydroxide phase is materially less. While the resultant plastic cement contains traces of the $MgSO_4 \cdot 6H_2O$ and a trace phase tentatively identified as $$3MgO \cdot MgSO_4 \cdot 11H_2O$$

it is nonetheless substantially insoluble in water and hence not subject to the disadvantage heretofore encountered in the "oxysulfate cements" which had water soluble sulfated magnesium hydroxide as their major phase.

While my preferred formulation has already been given, varying amounts of magnesium oxide can be added to the concentrated solution. The formualtions are as follows:

| Mole Ratio of MgO to $MgSO_4 \cdot 7H_2O$ | Weight Ratio | Magnesium Sulfate Percent by Weight Concentration in Solution |
|---|---|---|
| 3:1 | 30.0 to 70.0 | 75.0 |
| 4:1 | 39.5 to 60.5 | 75.0 |
| 5:1 | 44.9 to 55.1 | 70.0 |
| 6:1 | 49.5 to 50.5 | 70.0 |
| 7:1 | 53.4 to 46.6 | 65.0 |
| 8:1 | 56.7 to 43.3 | 65.0 |
| 9:1 | 59.5 to 40.4 | 62.0 |
| 10:1 | 62.1 to 37.9 | 62.0 |
| 11:1 | 64.2 to 35.7 | 60.0 |
| 12:1 | 66.3 to 33.7 | 55.0 |
| 13:1 | 68.0 to 32.0 | 52.0 |
| 14:1 | 69.6 to 30.4 | 50.0 |

It has been found that the magnesium sulfate concentrations for the above formulations may be varied from about 50 to 75 percent by weight solids without harming the water resistance of the resultant cements. It has also been found that the cements can be cured at either room temperature or heated to accelerate the reaction without harming the physical properties. However, if the cements are heated to accelerate the reaction, precautions must be taken so that the vapor pressure of the cement to air will be neutral. Generally speaking, for maximum workability and insolubility, I have found it preferable to work in the 6 to 1 mole ratio at about the range as set forth in the preceding formulation chart.

The oxysulfate cements have approximately only one-half of the dry strengths of the oxychloride cements and thus are not preferred. Illustrative of the process for the preparation of the preferred oxychloride cements is the following Example II.

EXAMPLE II

Similar considerations apply with respect to the preparation of insoluble magnesium oxychloride cements. For example, a preferred formulation is as follows (all parts being by weight):

| | Parts |
|---|---|
| $H_2O$ | 30 |
| $MgCl_2 \cdot 6H_2O$ | 100 |
| MgO | 100 |
| Sodium Hexametaphosphate ($Na_6P_6O_{18}$, commercially designated $Na_{16}P_{14}O_{43}$) | 1 |

In this instance, the solution was prepared by first admixing the sodium hexametaphosphate with water whereupon the $MgCl_2 \cdot 6H_2O$ crystals are added and mixed. The mixture was heated as in Example I in order to more rapidly solubilize the magnesium chloride hydrate. This resulted in a clear solution containing on the order of about 76 percent by weight solids.

The concentrated solution so prepared was then thoroughly admixed with the magnesium oxide in the manner already described in Example I. Because of the small quantity of water utilized, only small amounts of chloride hydroxide was formed, and primarily a true oxychloride of the system $5MgO \cdot MgCl_2 \cdot 9H_2O$ was present. In addition, the formulation produced relatively little heat of reaction, thus evidencing little or no conversion of the magnesium oxide to a hydroxide. The resultant cement contained little or no free chloride. When soaked in water, it did not appreciably hydrolyze to produce a free magnesium chloride which would have a corrosive effect.

As in the case of the oxysulfate cements, the chloride solution for the oxychloride cements may vary in concentration, in this case from 60 percent to as high as 85 percent by weight solids. In addition, the magnesium oxide to $MgCl_2 \cdot 6H_2O$ ratio can be varied from about 40 to about 60 percent by weight or from about 3.3–1 to 7.5–1 mole ratio. As before, the sodium hexametaphosphate is present in the amount of from 1 to 6 percent by weight based upon the $MgCl_2 \cdot 6H_2O$ solids content.

It is to be understood from the Examples I and II that sodium hexametaphosphate as commercially obtainable varies in $P_2O_5$ content, the preferred composition being one having the formula $Na_{16}P_{14}O_{43}$ which contains on the order of 67 percent by weight $P_2O_5$. For example, systems having the formula $Na_{15}P_{13}O_{40}$ to $Na_{20}P_{18}O_{55}$ can be employed. In addition to its function in increasing the concentration of the solution, sodium hexametaphosphate appears to perform other useful functions. Thus, it acts as a viscosity modifier which effectively reduces the viscosity of the highly concentrated cement slurry containing preferably about 80 to 90 percent by weight solids. It also reacts with the magnesium oxide, and while the extent to which such reaction takes place is not precisely known, it has been verified that an admixture of sodium hexametaphosphate and magnesium oxide in water will form a magnesium polyphosphate complex which is completely insoluble. Sodium hexametaphosphate additionally acts to control the activity of the cement slurry. It also serves by sequestration to tie up the calcium which appears as an impurity in magnesium oxide. I have, for example, employed a natural magnesium oxide containing as much as 3.5 percent calcium oxide, without experiencing the expected expansion and reduction in strength normally associated with an oxychloride cement containing this much calcium oxide. In fact, I have found that as much as 20 percent by weight active calcium oxide may be present in the magnesium oxide without ill effects.

It will be appreciated that the term "sodium hexametaphosphate" is descriptive of a large number of glassy chain phosphates normally called polyphosphates, the longer chains having associated values of $Na_2O/P_2O_5$ mole ratio near unity. At the present time, commercial sodium phosphate glasses fall into two groups: the glasses for which the $Na_2O/P_2O_5$ mole ratio varies from 1.10 to 1.15, and the glasses from which this ratio ranges from 1.33 to 1.50. The first group of glasses has been variously called "sodium hexametaphosphate," "Calgon" and "sodium septaphosphate." The average composition ranges from $Na_{15}P_{13}O_{40}$ to $Na_{20}P_{18}O_{55}$. It should be noted here that the term "hexametaphosphate" is a misnomer since these glasses are not metaphosphates and are surely not hexametaphosphates, but instead, are chain or polyphosphates ranging predominately from the tridecapolyphosphate to the octadecapolyphosphate. The second group of glassy phosphates have molecular weights ranging from that corresponding to formula $Na_6P_4O_{13}$ to $Na_8P_6O_{19}$. This group of glasses is known in the industry under the names "sodium tetraphosphate," "SQ phosphate," "Olilfos," and "Quadrofos." For most purposes, the differences between the sodium phosphate glasses for which the $Na_2O/P_2O_5$ mole ratio is about 1.1 and those for which the ratio is 1.4 are inconsequential, and both will work in the present inventon; however, the former are preferred, beng within the term "sodum hexametaphosphate" because of their ability to form a chelate in the magnesium salt solution.

In the manner of Examples I and II, inorganic plastic cement slurries and cured cements were prepared and their physical properties measured. The results are shown in the following Tables I to XII.

TABLE I.—EFFECT OF WATER SOUBLE PHOSPHATES ON CEMENT SLURRY

[Activity and viscosity]

Formulation: 5MgO:1MgCl$_2$·6H$_2$O:10H$_2$O (50 percent MgO—50 percent MgCl$_2$·6H$_2$O—74 percent MgCl$_2$·6H$_2$O solution). Additives: Percentage based upon the weight of the magnesium oxide.

| Percent by weight Chemical Additive | Water Bath Activity [a] | Stormer Viscosity Final Reading After 25 min. of testing every 2 minutes [b] |
|---|---|---|
| 0 | 30$^{00}$ mins | 19.6 sec. (too viscous to measure beyond 21 mins.) |
| % SHMP (sodium hexametaphosphate) added to H$_2$O used to prepare the magnesium chloride solution. | 45$^{00}$ mins | 14.2 sec. |
| % SHMP added to cement. | 27$^{50}$ mins | 20.0 sec. |
| % SHMP added to MgCl$_2$ solution (remained undissolved). | 27$^{23}$ mins | 20.2 sec. |
| % SHMP | 61$^{00}$ mins | 14.8 sec. |
| % H$_3$PO$_4$[c] | 45$^{00}$ mins | 16.2 sec. |
| % H$_3$PO$_4$ | 45$^{12}$ mins | 15.2 sec. |
| % H$_3$PO$_4$ | 50$^{10}$ mins | 15.0 sec. |
| % H$_3$PO$_4$ added to MgCl$_2$ solution. | 46$^{30}$ mins | 15.3 sec. |
| % SHMP+1% H$_3$PO$_4$[d] | 55$^{12}$ mins | 14.4 sec. |
| % SHMP+2% H$_3$PO$_4$ | 74$^{00}$ mins | 14.4 sec. |
| % SHMP+2% H$_3$PO$_4$ | 70$^{00}$ mins | 14.2 sec. |
| % Monomagnesium phosphate.[e] | 41$^{10}$ mins | 15.4 sec. |
| % Monomagnesium phosphate. | 40$^{15}$ mins | 15.2 sec. |
| % Pyrophosphoric acid | 100 mins 170° F. (max. temperature reached). | 15.0 sec. |
| % Pyrophosphoric acid | 70 mins. 148° F. (max. temp. reached). | 18.0 sec. |
| % ammonium polyphosphate. | 21$^{45}$ mins | 15.6 sec. |

[a] Activity Test—Cement slurry in a cup is placed in a 150° F. water bath. The activity is the time in minutes for temperature of the cement slurry to go from 110° F. to 180° F. The periods of time indicate the chemical activity of the cement as a function of the rate of the temperature rise. The phosphates dissolved in the concentrated magnesium salt solution markedly decrease the activity of the cement, probably by retarding hydration of the magnesium oxide.

[b] Viscosity Test—Stormer Viscosimeter—Time in seconds for 100 revolutions of a paddle with a 400 gram falling weight. Shorter times indicate decreased viscosity. With natural magnesium oxides as in Table I the preferred viscosity range is from 14 to 16 seconds and for a synthetic magnesium oxide, the preferred viscosity range is from 16 to 22 seconds, after testing from one to twenty-five minutes.

[c] The phosphoric acid and monomagnesium phosphate can be added to the concentrated magnesium salt solution without affecting the viscosity or activity.

[d] SHMP dissolved in H$_3$PO$_4$ and then added to magnesium salt solution.

The neat cements are those without filler materials. The following Tables II and III show the physical properties of such cements.

TABLE II.—NEAT CEMENT FORMULATIONS VERSUS PHYSICAL PROPERTIES

Cure—Room temperature, 5 days post cure, then tested.
Additive—One percent SHMP based on the weight of magnesium oxide.

| Formulation MgO: MgCl$_2$·6H$_2$O·H$_2$O | Water Bath Activity | MR (Dry) (p.s.i.)[1] | MR 2 Hrs. Boil (p.s.i.) | MR 48 Hrs. in water (p.s.i.) |
|---|---|---|---|---|
| 5:1:9 | 80 mins | 2,205 | 820 | 1,575 |
| 5:1:9.5 | 62$^{15}$ mins | 2,340 | 2,750 | 3,580 |
| 5:1:10 | 51$^{50}$ mins | 3,145 | 2,425 | [2] 3,500 |
| 5:1:11 | 36$^{30}$ mins | 1,880 | 2,911 | [2] 3,640 |
| 5:1:12 | 31$^{45}$ mins | 2,097 | 2,358 | 2,930 |
| 6:1:10 | 43$^{20}$ mins | 3,330 | 3,590 | [2] 3,780 |
| 6:1:11 | 32$^{00}$ mins | 3,625 | 3,485 | [2] 3,735 |
| 6:1:12 | 28$^{12}$ mins | 2,665 | 3,315 | 3,098 |
| 7:1:10 | 32$^{00}$ mins | 4,106 | 3,700 | [2] 2,230 |
| 7:1:11 | 27$^{50}$ mins | 3,215 | 4,450 | [2] 3,672 |
| 7:1:12 | 23$^{30}$ mins | 3,980 | 3,240 | [2] 3,540 |
| 7:1:13 | 23$^{16}$ mins | 3,582 | 2,970 | 2,295 |
| 7:1:14 | 19$^{35}$ mins | 3,174 | 1,870 | 1,394 |
| 7:1:15 | 17$^{32}$ mins | 3,044 | 0 | 1,295 |
| 8:1:10 | 32$^{45}$ mins | 4,760 | 4,443 | [2] 2,880 |
| 8:1:11 | 26$^{37}$ mins | 4,130 | 3,760 | [2] 3,340 |
| 8:1:12 | 21$^{00}$ mins | 4,305 | 3,980 | [2] 3,636 |
| 8:1:14 | 16$^{08}$ mins | 3,250 | 2,715 | 1,400 |
| 8:1:16 | 15$^{00}$ mins | 3,160 | 0 | 720 |

[1] MR is the modulus of rupture in pounds per square inch.
[2] Five days post cure was not enough since the boiling water continued the cure.

TABLE III.—CHEMICAL ADDITIVE EFFECT ON PHYSICAL PROPERTIES OF NEAT CEMENT

Cure—Room Temperature, 5 days post cure, then tested.
Formulation: 7MgO$_2$·1MgCl$_2$·6H$_2$O:11H$_2$O (58 percent MgO, 42 percent MgCl$_2$·6H$_2$O, 69 percent MgCl$_2$·6H$_2$O solution).
Percent Additve SHMP based upon the weight of magnesium oxide.

| Percent Additive | Water Bath Activity | MR (Dry) (p.s.i.) | MR 2 Hrs. Boil Water (p.s.i.) | MR 48 Hrs. in Water (p.s.i.) |
|---|---|---|---|---|
| 0 | 11$^{30}$ mins | 3,812 | 0 | 0 |
| 0.5 | 14$^{48}$ mins | 4,374 | 3,564 | 0 |
| 0.75 | 16$^{17}$ mins | 4,734 | 4,536 | 2,680 |
| 1.0 | 19$^{30}$ mins | 4,356 | 4,210 | 2,940 |
| 1.25 | 18$^{07}$ mins | 3,026 | 4,461 | 3,384 |
| 1.50 | 23$^{20}$ mins | 2,730 | 4,536 | 2,826 |
| 1.75 | 24$^{30}$ mins | 2,993 | 4,536 | 2,430 |
| 2.0 | 27$^{37}$ mins | 2,263 | 4,320 | 2,646 |

The following Tables IV–X show various physical properties of the fiber glass laminate products of the present invention.

TABLE IV.—PERCENT $MgCl_2 \cdot 6H_2O$ SOLUTION VERSUS LAMINATE

[Physical properties]

Data: $7MgO:1MgCl_2 \cdot 6H_2O$ (58 percent MgO—42 percent $MgCl_2 \cdot 6H_2O$).
Laminate Thickness—⅛″.
Press Temperature—230° F.; Cure Time, 5 mins.; Pressure, 0 to 200 p.s.i.
Glass Content—22 Percent by weight of laminate.
Chemical Additive—One percent SHMP based upon the weight of magnesium oxide.
Laminate Post Cured—5 days before testing.

| Percent by Weight Solution | Dry MR (p.s.i.) | 2 Hrs. in Boiling Water MR (p.s.i.) | 48 Hrs. in Water MR (p.s.i.) |
|---|---|---|---|
| 45 | 2,688 | 0 | 0 |
| 50 | 4,665 | 0 | 0 |
| 55 | 8,156 | 0 | 0 |
| 60 | 11,900 | 6,500 | 0 |
| 65 | 15,800 | 10,450 | 8,840 |
| 70 | 15,700 | 11,400 | 11,700 |
| 75 | 19,800 | 14,450 | 14,450 |
| 80 | 19,450 | 15,600 | 15,600 |

TABLE V.—SHMP VERSUS PHOSPHORIC ACID—EFFECT ON PHYSICAL PROPERTIES OF LAMINATE

Data: $6MgO:1MgCl_2 \cdot 6H_2O:11H_2O$ (54.5 percent MgO—45.5 percent $MgCl_2 \cdot 6H_2O$—69 percent $MgCl_2 \cdot 6H_2O$ solution).
Press Temperature—230° F.; Cure Time, 5 Mins.; Pressure, 0 to 200 p.s.i.
Glass Content—17 percent by weight of laminate.
Laminate Thickness—⅛″.
Chemical Additive—Percentage based upon the weight of magnesium oxide.

| Percent by weight Chemical Additive | Dry MR (p.s.i.) | 2 hrs. in boiling water MR (p.s.i.) | 48 hrs. in water MR (p.s.i.) | 30 days in water MR (p.s.i.) | Dry recovered MR (p.s.i.) after 30 days in water |
|---|---|---|---|---|---|
| 0% | 21,600 | 0 | 9,320 | 9,300 | 15,300 |
| 0.5% SHMP | 16,000 | 10,500 | 9,730 | 9,700 | 13,500 |
| 0.5% $H_3PO_4$ | 19,350 | 11,000 | 14,100 | 9,700 | 13,500 |
| 1.0% SHMP | 16,700 | 12,800 | 12,700 | 11,100 | 16,200 |
| 1.0% $H_3PO_4$ | 19,500 | 13,500 | 16,300 | 11,500 | 16,500 |
| 2.0% SHMP | 16,050 | 15,700 | 13,050 | 11,700 | 17,300 |
| 2.0% $H_3PO_4$ | 19,500 | 18,900 | 17,000 | 14,200 | 19,200 |
| 3.0% SHMP | 15,050 | 16,400 | 13,650 | 13,800 | 21,000 |
| 3.0% $H_3PO_4$ | 17,900 | 18,400 | 15,500 | 15,500 | 21,600 |
| 1% SHMP+1% $H_3PO_4$ | 18,400 | 17,400 | 15,200 | 13,800 | 15,700 |
| 1% SHMP+2% $H_3PO_4$ | 20,300 | 18,800 | 15,900 | 15,300 | 20,000 |

TABLE VI.—EFFECT OF SOLUBLE PHOSPHATES ON PHYSICAL PROPERTIES OF LAMINATE

Data: $7MgO:1MgCl_2 \cdot 6H_2O:11H_2O$ (58 percent MgO—42 percent $MgCl_2 \cdot 6H_2O$; 69 Percent $MgCl_2 \cdot 6H_2O$ solution).
Press Temperature—230° F.; Cure time, 5 mins; Pressure, 0 to 200 p.s.i.
Laminate thickness—⅛″.
Glass Content—22 percent by weight of laminate.
Additive—Percentage based upon the weight of magnesium oxide.
The laminate was post cured five days before testing.

| Percent by weight Chemical Additives | Dry MR (p.s.i.) | 2 Hrs. in boiling Water MR (p.s.i.) | 48 hours in Water MR (p.s.i.) |
|---|---|---|---|
| 2% SHMP | 16,050 | 15,700 | 13,050 |
| 2% Phosphoric acid | 19,500 | 18,900 | 17,000 |
| 1% SHMP+2% phosphoric acid | 20,300 | 18,800 | 15,900 |
| 0.5% ammonium polyphosphate | 20,300 | 13,200 | 14,950 |
| 1.0% ammonium polyphosphate | 19,700 | 11,400 | 14,450 |

TABLE VII.—EFFECT OF TYPE OF MIXER ON LAMINATE PHYSICAL PROPERTIES

Data: $6MgO:1MgCl_2 \cdot 6H_2O:11H_2O$ (54.5 percent MgO, 45.5 percent $MgCl_2 \cdot 6H_2O$, 69 percent $MgCl_2 \cdot 6H_2O$ solution).
Laminate Thickness—⅛″.
Press Temperature—230° F.; Cure time, 5 mins; Pressure, 0 to 200 p.s.i.
Glass Content—20 percent by weight of laminate (reinforcing fibers, fiberglass mat).
Additive—1 percent SHMP+2 percent $H_3PO_4$ based upon the weight of the magnesium oxide.

| Type Mixer | Mixing Time | Dry MR (p.s.i.) | 2 hrs. in boiling water MR (p.s.i.) | 48 hrs. in water MR (p.s.i.) |
|---|---|---|---|---|
| Hobart [1] TM | 15 mins. (thixotropic). | 10,500 | 6,350 | 5,920 |
| Osterizer Blender [2] TM. | 2 mins. | 17,600 | 16,000 | 14,200 |

[1] Low speed beater mixer (about 200 r.p.m.).
[2] High-speed—high shear propeller mixer (about 20,000 r.p.m.).

The Hobart type of mixing at the relatively low speeds produces poor shear and thus does not readily break down the magnesium oxide agglomerates which in turn results in poor dispersion and deflocculation of the magnesium oxide particles. The type of mixer used by the prior art for mixing oxychloride cements has been a beater type of mixer at low speed. Longer periods of blending are necessary using the beater type mixers at high speeds, approaching those obtained with the propeller type mixers. The Osterizer produces high shear blending (speed 20,000 r.p.m.) in a very short period of time (5 minutes or less) and thus is preferred.

It has been found that proper blending can be achieved where the dry solids are mixed together and then blended with water using the high shear blending. Thus, a formulation of $5MgO:1MgCl_2 \cdot 6H_2O:10H_2O$ had an activity of 18 minutes 40 seconds and a viscosity after 25 minutes of 19.4 seconds without any additives. The preferred viscosity range, with or without additives, is between about 12 to 22 seconds, Stormer viscosity using the 400 gram weight after 25 minutes testing with high shear blending, which is much lower than is taught by the prior art. Where the Hobart mixer was used, regardless of the mode of combination of the solids with water, the viscosities were too high to measure using the Stormer viscosity test.

TABLE VIII.—EFFECT OF PROLONGED POST CURE ON PHYSICAL PROPERTIES OF LAMINATE

Data—6MgO:1MgCl$_2$·6H$_2$O:11 H$_2$O (54.5 percent MgO, 45.5 percent MgCl$_2$·6H$_2$O, 69 percent MgCl$_2$·6H$_2$O solution).
Laminate Thickness—⅛".
Press Temperature—230° F.; Cure—5 Min.; Pressure—0 to 200 p.s.i.
Glass Content—17 percent by weight by laminate.
Additives—Percentage based upon magnesium oxide.

| Percent by weight Chemical Additive | 5 days post cure-dry MR (p.s.i.) | 30 days post cure-dry MR (p.s.i.) | 5 days post cure, 48 hrs. in water MR (p.s.i.) | 30 days post cure, 48 hrs. in water MR (p.s.i.) |
|---|---|---|---|---|
| 0% SHMP | 16,700 | 22,500 | 12,700 | 15,500 |
| 0% H$_3$PO$_4$ | 19,300 | 27,300 | 16,300 | 22,000 |
| 0% SHMP | 16,050 | 18,900 | 13,050 | 13,450 |
| 0% H$_3$PO$_4$ | 19,500 | 26,000 | 17,000 | 18,700 |
| % SHMP+1% H$_3$PO$_4$ | 18,400 | 23,800 | 15,200 | 16,550 |
| % SHMP+2% H$_3$PO$_4$ | 20,300 | 24,000 | 15,900 | 18,400 |

TABLE IX.—EFFECT OF VACUUM DEGASSING ON PHYSICAL PROPERTIES OF LAMINATE

Data—6MgO:1MgCl$_2$·6H$_2$O:11 H$_2$O (54.5 percent MgO, 45.5 percent MgCl$_2$·6H$_2$O, 69 percent MgCl$_2$·6H$_2$O solution).
Laminate thickness—⅛".
Press Temperature—230° F.; Cure time, 5 min.; Pressure, 0 to 200 p.s.i.
Additive—1 percent SHMP + 2 percent H$_3$PO$_4$ based upon magnesium oxide.

| Vacuum Degassed | Dry MR (p.s.i.) | 2 hrs. in boiling water MR (p.s.i.) | 48 hrs. in water MR (p.s.i.) |
|---|---|---|---|
| 5 mins | 17,850 | 15,900 | 17,200 |
| None | 18,850 | 17,400 | 14,700 |

The vacuum degassed cement had a reduced viscosity.

TABLE X.—EFFECT OF CURE TEMPERATURE AND TIME ON PHYSICAL PROPERTIES OF LAMINATE

Data: 7MgO:1MgCl$_2$·6H$_2$O:11 H$_2$O (58 percent MgO, 42 percent MgCl$_2$·6H$_2$O, 69 percent MgCl$_2$·6H$_2$O solution).
Laminate Thickness—⅛".
Glass Content—22 percent by weight of laminate.
Additive—2 percent SHMP on magnesium oxide.

| Temperature of Press ° F. | Cure time, minutes | Dry MR (p.s.i.) | 2 hrs. in boiling water MR (p.s.i.) | 48 hrs. in water MR (p.s.i.) |
|---|---|---|---|---|
| 78 | 24 hrs | 19,100 | 15,900 | 15,750 |
| 150 | 75 mins | 17,900 | 15,750 | 13,450 |
| 200 | 15 mins | 17,150 | 13,300 | 11,320 |
| 230 | 5 mins | 17,800 | 12,600 | 14,700 |
| 250 | 5 mins | 14,500 | 13,000 | 11,100 |
| 300 | 5 mins | 12,900 | 9,000 | 10,300 |

The cements were also used in the preparation of wood fiber board products. At the high solids content of the cement, no additional drying was necessary. The physical properties of these products are shown in Tables XI and XII.

TABLE XI.—EXCELSIOR FIBERBOARD DATA

Formulation—7MgO:1MgCl$_2$·6H$_2$O:11 H$_2$O (58.0 percent MgO, 42.0 percent MgCl$_2$·6H$_2$O, 69 percent MgCl$_2$·6H$_2$O solution).

Press temperature—300° F.; cure time—6 mins.
Type fiber: Excelsior—percent fiber—32 percent by weight of fiberboard.
Additive—2 percent H$_3$PO$_4$+1 percent SHMP based upon weight of MgO.
Density range of product, pounds per cubic foot (12% by weight equilibrium moisture content) _____ 18–24
Range dry MR (p.s.i.) _____ 550–600
Range after 2 hours in boiling water MR (p.s.i.) _____ 315–435
Range after 14 days in water MR (p.s.i.) _____ 375–405
Range after 14 days at 90 percent relative humidity at 90° F. MR (p.s.i.) _____ 630–830
Range after 14 days at 160° F. and 95 percent relative humidity MR (p.s.i.) _____ 540–830
Range after 6 cycles of ASTM–C481–61T MR (p.s.i.) * _____ 400–540

* Also known as the Forest Products Accelerated Aging Test. The sample was exposed six times to the following cycle of test conditions:
  1 hr.—Immersion in 122° F. water.
  3 hrs.—Exposure to steam spray, 194° to 208° F.
  20 hrs.—Exposure to 10° F. air.
  3 hrs.—Exposure to 212° F. air.
  3 hrs.—Exposure to steam spray, 194° to 208° F.
  18 hrs.—Exposure to 212° F. air.

TABLE XII.—EFFECT OF SOLUBLE PHOSPHATES ON PHYSICAL PROPERTIES OF EXCELSIOR FIBERBOARD

Formulation: 7MgO:1MgCl$_2$·6H$_2$O:11H$_2$O (58 percent MgO, 42 percent MgCl$_2$·6H$_2$O, 69 percent MgCl$_2$·6H$_2$O solution).
Press Temperature—300° F.; Cure time, 6 mins.
Type Fiber: Excelsior—Percent fiber, 32 percent by weight of fiberboard.
Chemical Additive—Percentage Based upon weight of MgO.

| (1) Percent By Weight Chemical Additive | (2) Sample Density (lbs. per cubic foot, at 12 percent equilibrium moisture content | (3) Dry MR (p.s.i.) | (4) After 2 hrs in boiling water MR (p.s.i.) | (5) Percent Swelling | (6) After 24 Hrs. in Water MR (p.s.i.) | (7) Percent Swelling |
|---|---|---|---|---|---|---|
| 0% | 24.0 | 514 | 289 | 3.75 | 311 | 4.50 |
| 2% SHMP | 23.2 | 554 | 337 | 1.73 | 338 | 1.73 |
| 2% phosphoric acid | 23.4 | 603 | 345 | 0.86 | 360 | 0.86 |
| 3% phosphoric acid | 23.3 | 615 | 338 | 0 | 338 | 0 |
| 2% phosphoric acid +1% SHMP | 24.7 | 653 | 370 | 0 | 420 | 0 |
| 2% monomagnesium phosphate | 23.9 | 626 | 338 | 0 | 368 | 0 |
| 3% monomagnesium phosphate | 24.3 | 636 | 373 | 0 | 345 | 0 |
| 2% pyrophosphoric acid | 23.6 | 504 | 303 | 3.0 | 390 | 1.73 |
| 2% ammonium polyphosphate | 23.6 | 604 | 383 | 0 | 338 | 0.86 |

Another major use of the cements, particularly the oxychlorides, is in flooring wherein the cement serves as a binder for one or more fillers, such as sawdust, asbestos, dolomite and bark (Silvacon). The preparation of such a product is shown by the following Example III.

EXAMPLE III

A flooring having exceptionally good physical properties was prepared as follows:

| | Parts |
|---|---|
| $H_2O$ | 66 |
| Sodium hexametaphosphate ($Na_6P_6O_{18}$ commercially designated $Na_{16}P_{14}O_{43}$) | 2.2 |
| $MgCl_2 \cdot 6H_2O$ | 224 |
| MgO | 224 |

The sodium hexametaphosphate was first admixed with the water followed by the magnesium chloride crystals, whereupon the magnesium oxide was added and thoroughly admixed, thereby providing a slurry to which the following fillers were added and admixed, all parts being by weight:

| | Parts |
|---|---|
| Asbestos | 24 |
| Coarse dolomite | 24 |
| Fine dolomite | 24 |
| Sawdust | 30 |
| Silvacon | 72 |

The foregoing procedure is in itself a departure from conventional practice in that it is customary procedure to first compound all of the dry materials and then add the gauging solution. I have found, however, that where this is done, the binder is far less effective in its attachment to the fillers than where the fillers are added to the already thoroughly admixed binder slurry, probably because of absorption of magnesium chloride into the filler materials.

A flooring material prepared in accordance with the foregoing formulation was found to have the following physical properties:

TABLE XIII

| | P.s.i. |
|---|---|
| Compression strength (dry) | 7400 |
| Compression strength (wet) [1] | 7230 |
| Modulus of rupture (dry) | 1481 |
| Modulus of rupture (wet) [1] | 1500 |
| Modulus of elasticity (dry) | 640,000 |
| Modulus of elasticity (wet) [1] | 721,000 |

[1] Submerged in water for 48 hours.

As can be seen from Tables II to XIII, the modulus of rupture for the dry cements are very high. This is particularly true of those cement products with the soluble phosphate additives. The wet strengths after 2 hours in boiling water, 48 hours, 14 days, or 30 days in water at ambient temperatures are poor for those cements without the soluble phosphate additives; however, after such cements are dried, they substantially recover their strength. This is shown in Table V where the dry recovered modulus of rupture after 30 days in water almost is comparable to the initial modulus of rupture. This shows that even without the phosphate additives, the cements are substantially water insoluble.

From the foregoing Examples II and III and Tables I–XIII it is evident that the instant invention provides truly insoluble magnesium oxychloride cements having wide and diverse uses. The oxysulfate cements prepared in the manner of Example I are also water insoluble in about the same manner as the oxychloride cements. They are plastic in character and may be used for decorative coverings and coatings for walls, floors and ceilings and as a binder in the formulation of structural building panels incorporating diverse fillers such as wood chips, sawdust, excelsior, straw, fiber glass and other fibrous materials. While the so called "oxysulfate" and "oxychloride" cements of the prior art have been used for such purposes, their use has been greatly restricted due to the fact that such compounds are not truly insoluble in water nor do they possess the strength characteristic of the plastic cements of the instant invention. For example, a flat sheet of the oxychloride plastic cement of the present invention having a thickness on the order of one-eighth inch and containing 20–30 percent glass fiber reinforcement when molded without pressure will have a modulus of rupture on the order of 16,000–24,000 p.s.i. and an elasticity on the order of one million p.s.i. In addition, the cements may be foamed by the incorporation of various known materials for use as structural building materials and the like.

The cements also may be applied as protective coatings—literally as paints—having a thickness on the order of about five mils. Such thin films provide a continuous protective covering which is both water and fire resistant. As already indicated, the oxychloride cements are translucent which makes them highly suited for corrugated panels and the like wherein a light transmission is desired and the cements may be readily colored or tinted to produce decorative effects.

Magnesium oxide is a water hating particle and as such is relatively unstable and tends to coagulate or flocculate. The water soluble phosphates help to deflocculate the slurry thus reducing the viscosity, as the deflocculated slurry will have a low resistance to flow. It is believed that the enhanced deflocculation of the magnesium oxide by the water soluble phosphate molecules is due to the absorption of the phosphates at the surface of the magnesium oxide where they form complexes and thereby present a charged portion of the uncomplexed ion to the media. Also, these phosphates have a "threshold effect" as well as complexing. The "threshold effect" is a crystal growth interference which prevents deposition of soluble substances and controls crystals size growth in the cement which produces higher strengths. The threshold effect prevents deposition of the magnesium chloride crystals at the higher magnesium salt concentrations at below ambient temperatures.

As can be seen from the foregoing Tables I–XIII, the soluble phosphates are exceptionally useful in the preparation of inorganic plastic cement slurries and cured cements in that they enhance various important physical properties of these cements. In a like manner, the water insoluble phosphates were blended into the cement slurry but it was found that they were not as effective as with the water soluble phosphates and thus are not preferred.

Phosphoric acid and soluble strongly acid salts thereof react in the magnesium salt solution to form a soluble magnesium phosphate. A yellow solution is obtained with a very irritating odor when phosphoric acid, pyrophosphoric acid, and monomagnesium phosphate are dissolved in water and then the magnesium salt added. These compounds can also be added directly to the concentrated magnesium salt solution or to the cement slurry during blending.

Where soluble phosphate salts are being used in the magnesium salt solution, they are preferably dissolved in water before the magnesium salt is added to form the highly concentrated magnesium salt solution since the soluble phosphate salts are insoluble in the highly concentrated magnesium salt solutions. The phosphate salts can be dissolved in strong acids, preferably phosphoric acid, so that they can be dissolved in the concentrated magnesium salt solutions. These compounds can also be added to the cement slurry during blending as would normally be done with the insoluble phosphates.

The chain or polyphosphates such as sodium hexametaphosphate are particularly preferred for use in the magnesium salt solution because they act as chelating agents to keep the magnesium salt in solution at below ambient temperatures. This is a considerable problem when as here the magnesium salt solutions are highly oncentrated. The polyphosphates also act as dispensing agents for the magnesium oxide and magnesium salt in the inorganic plastic cement slurry as well as to deagglomerate and deflocculate the magnesium oxide.

The magnesium oxide utilized in the instant invention may be either natural or synthetic, and both the natural and synthetic magnesium oxides result in insoluble plastic cements. However, synthetic oxides are preferred due to their plate-like structure, uniform consistency and absence of trace amounts of impurities such as iron which tend to discolor the cement. Such discoloration is particularly undesirable in the oxychloride plastic cements which are translucent.

The preferred magnesium oxide specification ranges are shown in the following Table XIV:

TABLE XIV

|  | Percent |
| --- | --- |
| MgO | 74 to 97 |
| Loss on Ignition | 0.5 to 13.0 |
| $SiO_2$ | 0.1 to 3.5 |
| $R_2O_3$ | 0.3 to 1.5 |
| CaO | 0.1 to 3.5 |
| $CO_3$ | 0 to 1.0 |
| Cl | 0.1 to 3.5 |
| $SO_4$ | 0.1 to 2.5 |

The chemical composition of the magnesium oxide is not as important as the physical properties. The preferred physical properties are shown in the following Table XV:

TABLE XV

Iodine number—15–60
Particle size distribution—50 percent less than 0.2 to 0.3 micron, 100 percent less than 20 microns
Crystal system—Hexagonal plates
Crystal size—0.02 to 0.035 micron Generally speaking, magnesium oxide (magnesia) with the above described properties is considered to be active and will react with the magnesium salt to form satisfactory inorganic plastic cements. In general, the magnesium oxide is finely divided (about 0.1 to 100 microns) for use in the preparation of inorganic plastic cements. The bulk density is in the range from about 20 pounds per cubic foot to about 60 pounds per cubic foot with the average bulk density being about 30 pounds per cubic foot.

It is extremely important that the magnesium oxide-magnesium salt solution be blended so as to deagglomerate and deflocculate the magnesium oxide particles and to disperse the magnesium oxide in the magnesium salt solution. This can only be accomplished by using high shear blending. If proper blending is not conducted the resultant cured cements will not have the water insoluble oxychloride and oxysulfate systems and will have poor properties. More vigorous blending must be used if the water soluble phosphates are not used. The equipment for high shear blending is known to the prior art and examples of such equipment, such as sonic homogenizers, colloid mills, high pressure impact mills, turbine and propeller mixers and the like are described in "Chemical Engineers Handbook" (3rd ed.) McGraw-Hill (1950) at pages 1202 to 1214.

In general, the inorganic plastic cement slurry is blended until the temperature reaches 120–135° F. if cooling is not provided, or with cooling to a low viscosity slurry. The water soluble phosphate additives are helpful in preventing the formation of a thixotropic slurry during blending.

The cement slurry can be used immediately or cooled for storage. At 0° F. the slurry can be stored for thirty days without loss of physical properties. The slurry can also be vacuum degassed in order to reduce its viscosity and improve the physical properties of the cement.

In the preparation of the inorganic plastic cements of the present invention anhydrous or hydrated magnesium salts (magnesium chloride and/or magnesium sulfate) can be used. It is preferred to use the hydrated salts since they are less expensive and in any event the magnesium salts are hydrated by the addition of water in the preparation of the cements.

Having thus described the invention in certain exemplary embodiments, what is desired to secure and protect by Letters Patent is:

I claim:
1. The process for the preparation of an inorganic plastic cement slurry by the reaction of magnesium oxide with a magnesium salt in the presence of water which cures into a high strength, substantially water-insoluble plastic cement which comprises: mixing by high shear blending (a) a magnesium salt selected from the group consisting of magnesium chloride and magnesium sulfate in the presence of sufficient water to produce a highly concentrated solution of the magnesium salt such that water soluble phosphate salts will not dissolve in a solution of the magnesium salt and water of that concentration, and (b) finely divided, active magnesium oxide which is reactive with the magnesium salt, so as to de-agglomerate and defloculate the magnesium oxide and to uniformly disperse the magnesium oxide and magnesium salt solution, thereby producing a low viscosity inorganic plastic cement slurry.

2. The process of claim 1 wherein the magnesium salt is provided in water prior to blending with the magnesium oxide.

3. The process of claim 1 wherein in addition the plastic cement slurry is cooled to below ambient temperatures to retard curing.

4. The process of claim 1 wherein in addition an amount of a phosphate sufficient to improve the wet strength of the cured cement is provided in the cement slurry.

5. The process of claim 1 wherein in addition the plastic cement slurry is admixed with a filler material and then cured.

6. The process of claim 1 wherein in addition the plastic cement slurry is degassed at reduced pressures.

7. The process of claim 1 wherein the magnesium salt is provided in water at a concentration between 50 to 75 percent by weight magnesium sulfate considered as its septahydrate and between 60 to 85 percent by weight magnesium chloride considered as its hexahydrate containing between about one and six percent by weight based upon the weight of the magnesium salt considered as its hydrate of a phosphate which improves the wet strength of the cured inorganic plastic cement dissolved in the resulting solution, prior to blending with the magnesium oxide, the mole ratio of magnesium oxide to magnesium sulfate considered as its septahydrate being between about 3:1 and 14:1 and the mole ratio of magnesium oxide to magnesium chloride considered as its hexahydrate being between about 3.3:1 and 7.5:1.

8. The process of claim 7 wherein the phosphate salt is monomagnesium phosphate.

9. The process of claim 7 wherein the phosphate salt is a polyphosphate salt.

10. The process of claim 1 wherein a phosphoric acid is provided in the plastic cement slurry.

11. The process of claim 7 wherein the phosphate is a mixture of a polyphosphate and a phosphoric acid.

12. The solution used in the preparation of inorganic plastic cement slurrys which comprises: a water solution of (a) a magnesium salt selected from the group consisting of magnesium chloride and magnesium sulfate, the solution containing a concentration of magnesium salt such that water soluble phosphate salts will not dissolve upon addition to the magnesium salt solution, and (b) between about one and six percent by weight based upon the weight of the magnesium salt considered as magnesium sulfate septahydrate and magnesium chloride hexahydrate of a water soluble phosphate salt which improves the wet strength of the inorganic plastic cements resulting from the curing of inorganic plastic cement slurry prepared from the solution dissolved in the solution.

13. The solution of claim 12 wherein the phosphate salt is monomagnesium phosphate.

14. The solution of claim 12 wherein a phosphoric acid is added to the solution to form the phosphate salt.

15. The solution of claim 14 wherein the phosphoric acid is ortho phosphoric acid.

16. The solution of claim 12 wherein the phosphate salt is a polyphosphate salt.

17. The solution of claim 12 wherein the phosphate salt is a mixture of a polyphosphate and a phosphoric acid.

18. The article of manufacture which comprises a high strength substantially water insoluble cured inorganic plastic cement with the system selected from the group consisting of water insoluble magnesium oxysulfate and magnesium oxychloride as a major phase and only trace amounts of water soluble sulfate-hydroxide and chloride-hydroxide phases resulting from the curing of an inorganic plastic cement slurry prepared by mixing by high shear blending (a) a magnesium salt selected from the group consisting of magnesium chloride and magnesium sulfate in the presence of sufficient water to produce a highly concentrated solution of the magnesium salt such that water soluble phosphate salts will not dissolve in a solution of the magnesium salt and water of that concentration and (b) finely divided, active magnesium oxide which is reactive with the magnesium salt, so as to deagglomerate and deflocculate the magnesium oxide and to uniformly disburse the magnesium oxide and magnesium salt solution, to produce a low viscosity inorganic cement slurry.

19. The article of manufacture of claim 18 which in addition contains a filler material.

20. The article of manufacture of claim 18 wherein in addition the inorganic plastic cement contains a phosphate salt which is insoluble in the cement as a minor phase to improve the wet strength of the cement.

21. The article of manufacture of claim 20 wherein the phosphate salt is a polyphosphate salt.

22. The article of manufacture of claim 18 wherein the magnesium oxysulfate system is $5MgO \cdot MgSO_4 \cdot 8H_2O$ and wherein the magnesium oxychloride system is $5MgO \cdot MgCl_2 \cdot 9H_2O$.

23. The article of manufacture of claim 18 wherein the magnesium oxysulfate system is $5MgO \cdot MgSO_4 \cdot 8H_2O$ and wherein the magnesium oxychloride system is $$5MgO \cdot MgCl_2 \cdot 9H_2O$$

and wherein the inorganic plastic cement contains a phosphate salt which is insoluble in the cement as a minor phase to improve the wet strength of the cement.

References Cited by the Examiner

UNITED STATES PATENTS

| | | | |
|---|---|---|---|
| 644,953 | 3/1900 | Ulich | 106—106 |
| 711,329 | 10/1902 | Mielck | 106—106 |
| 1,000,386 | 8/1911 | Eggenhoffner | 106—106 |
| 1,067,413 | 7/1913 | Eckschlager | 106—106 |
| 1,853,521 | 4/1932 | Stewart | 106—106 |
| 2,351,641 | 6/1944 | Sohl et al. | 106—106 |
| 2,543,959 | 3/1951 | Eastin | 106—106 |
| 2,702,753 | 2/1955 | Dickey | 106—106 |
| 2,745,759 | 5/1956 | Pavlish | 106—106 |

OTHER REFERENCES

Creskoff: "Vacuum Concrete," The Canadian Engineer, December 5, 1939, pages 4–8.

Rippon: "Vacuum Processing of Shasta Dam Spillway," Engineering News Record, June 14, 1945, pages 93–96.

TOBIAS E. LEVOW, *Primary Examiner.*

HELEN M. McCARTHY, *Examiner.*

S. E. MOTT, *Assistant Examiner.*